Figure 1:
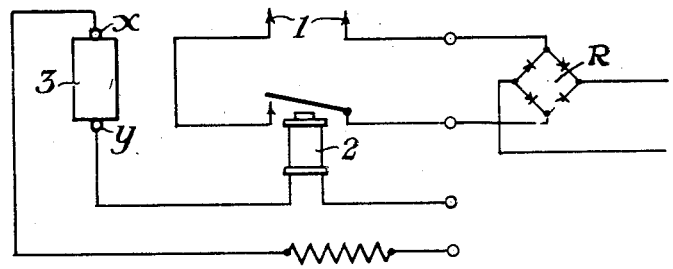

May 23, 1939. S. A. STEVENS 2,159,537

ELECTRICAL RECTIFIER INSTALLATION

Filed July 1, 1936

INVENTOR
Sydney Arthur Stevens.
BY
HIS ATTORNEY

Patented May 23, 1939

2,159,537

UNITED STATES PATENT OFFICE 2,159,537

ELECTRICAL RECTIFIER INSTALLATION

Sydney Arthur Stevens, London, England, assignor, by mesne assignments, to The Union Switch & Signal Company, Swissvale, Pa., a corporation of Pennsylvania Application July 1, 1936, Serial No. 88,288
In Great Britain August 29, 1935

8 Claims. (Cl. 175—363)

This invention relates to electrical rectifier installations of the kind adapted to deal with relatively large currents and comprising cooling fluid circulating systems.

According to the invention arrangements are associated with the cooling fluid circulating system of a rectifier which are adapted to control the operation of the latter in accordance with one or more working conditions of the cooling fluid circulatory system so as to prevent the rectifier from being overheated.

In carrying the invention into practice the control of the operation of the rectifier may be arranged to be effected in accordance with the temperature of the cooling fluid by means of a thermostat located in a selected portion of the circulatory system, or in accordance with the speed of the fan or its equivalent, which promotes the circulation of cooling fluid in the system, by means of a centrifugal governor associated with the fan or its equivalent or in accordance with the rate of flow of the cooling fluid circulating in the system by means of a vane or its equivalent located in the system and subject to the flow of the cooling fluid.

In a preferred embodiment of the invention the main supply circuit of the rectifier is arranged to be controlled by an electric relay, in the energizing circuit of which is a movable contact arranged to be actuated by the thermostatic device, governor or vane as the case may be, so as to deenergize the relay and thus break the main circuit of the rectifier in the event of the temperature of the cooling fluid exceeding a predetermined value, or the speed of the fan or its equivalent or of the cooling fluid itself falling below a predetermined value.

In order that the invention may be readily understood it will now be described with reference to the accompanying drawing, by way of example only, as applied to the thermostatic control of a rectifier installation comprising a number of relatively large rectifying plates of the dry surface contact type and having ducts or conduits between the plates through which air is circulated by means of a fan or its equivalent in order to dissipate the heat generated by the passage of electric current through the rectifier.

Figure 4:
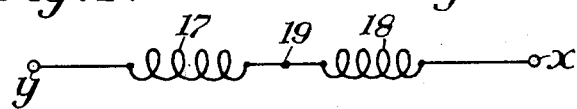
Figure 5:
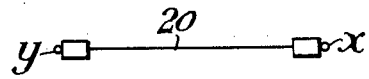
Figure 6:
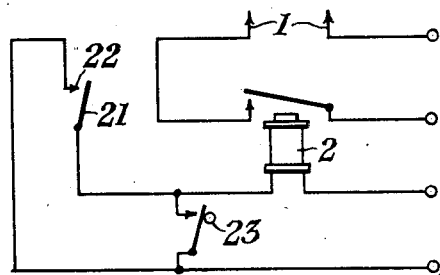

In the drawing:

Figure 1 is a circuit diagram illustrating the use of a thermostatic device for controlling the operation of the rectifier, Figures 2, 3, 4, and 5 are somewhat diagrammatic views illustrating several suitable alternative forms of thermostatic device for use in the circuit illustrated in Figure 1, and Figure 6 is a circuit diagram illustrating the use of a centrifugal governor associated with a fan promoting the circulation of the cooling air, or the use of a vane or its equivalent subject to the flow of the cooling air for controlling the operation of the rectifier.

Figures 2, 3:
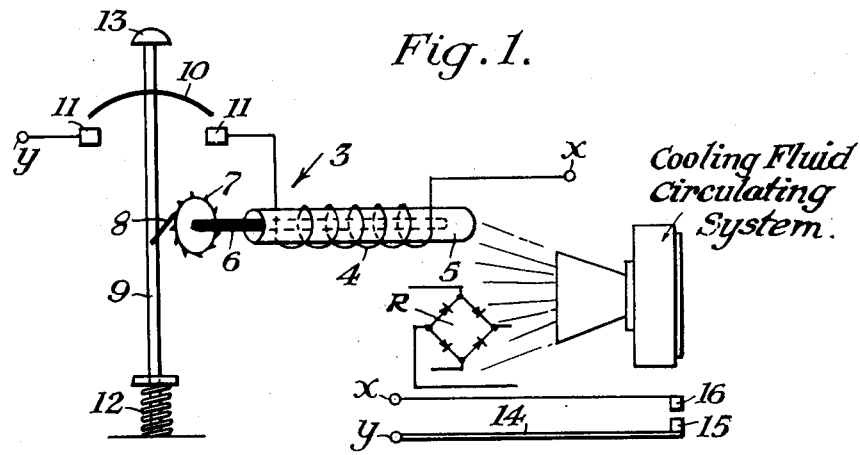

Referring first to Figures 1 and 2 the main supply circuit 1 of the rectifier R is arranged to be controlled by an electric relay 2 in the energizing circuit of which are contacts arranged to be opened by a thermostatic device 3 located in a selected portion of the air circulating system of the rectifier and thus break the main circuit 1 of the rectifier in the event of the temperature of the air circulating in the system exceeding a predetermined value.

The thermostatic device 3 (shown in Figure 2) is provided with terminals X, Y and comprises a heating resistance wire 4 wound upon a tube 5 in which a rod or shaft 6 is fixed by a metal alloy of relatively low melting point. At one end of the rod or shaft 6 a ratchet wheel 7 is secured which is arranged to cooperate with a pawl 8 connected to a rod 9 carrying a movable contact member 10 so as normally to maintain this contact member in engagement with cooperating fixed contacts 11, it being understood that the two contacts of the thermostatic device, the heating resistance wire and the winding of the electric relay 2 (Figure 1) are in series with one another and connected to a suitable secondary current supply circuit.

The heating resistance wire 4 which is heated by the passage of current therethrough is exposed to the flow of cooling air in the ducts of the rectifier and the arrangement is such that so long as the air is flowing at a sufficient speed adequately to cool the rectifier the resistance wire 4 is sufficiently cooled to prevent the fusing of the metal alloy of low melting point.

Should, however, the flow of air fall below this speed owing for example to failure of the fan or its equivalent or to an obstruction in the ducts, heat will not be dissipated from the resistance wire 4 sufficiently rapidly to prevent the temperature of the tube 5 upon which the wire is wound from rising to a value sufficient to melt the metal alloy. When this occurs the rod or shaft 6 is free to rotate and a return spring 12 associated with the rod 9 raises the latter and the contact member 10 whilst the pawl 8 rotates the ratchet wheel 7 and rod or shaft 6.

When the contact member 10 is raised out of engagement with the other cooperating contacts 11, the energizing circuit of the electric relay 2 (Figure 1) is broken as will be evident and the relay 2 effects the opening of the main circuit 1 and consequently renders the rectifier inoperative.

When the defect in the cooling system has been attended to and the metal alloy has solidified once more and again prevents the rod or shaft 6 and ratchet wheel 7 from being rotated, the installation may be set into operation again, by moving against the action of the spring 12 the contact member 10 of the thermostatic device 3 into engagement with the cooperating contacts 11 by means of a knob 13 provided on the rod 9 at the outside of the casing of the device. The pawl 8 will then engage another tooth of the ratchet wheel 7 and prevent the opening of the contacts of the device by the spring 12 until such time as the alloy may be melted again.

As will be appreciated any number of thermostatic devices may be connected in series in the secondary or relay circuit, it being preferred to locate a thermostatic device in each separate air duct of a rectifier installation comprising a number of such ducts, so that in the event of the flow of air in any one duct being insufficient the relay 2 will be deenergized, and the main circuit 1 opened. Moreover, as the resistance wire 4 of the thermostatic device is in series with the contacts and the relay, the fracture or burning out of the resistance wire would result in the deenergization of the relay and opening of the main circuit 1.

The thermostatic device hereinbefore described with reference to Figure 2 may, as will be appreciated, be replaced by any other suitable thermostatic device adapted to break the secondary circuit, in which the relay 2 is located, in the event of the device being overheated when the rate of flow of air or other fluid past such device falls below a certain value.

For instance the thermostatic device described with reference to Figure 2 may be replaced by any of the thermostatic devices illustrated in Figures 3–5.

As shown in Figure 3 the thermostatic device 3 comprises a bi-metallic strip 14 carrying a contact 15 adapted to cooperate with a contact 16, this device being connected in the secondary circuit in series with the relay 2 (Figure 1) by means of its terminals X, Y. So long as the air is flowing at a sufficient speed adequately to cool the rectifier, the temperature of the bi-metallic strip 14 which is heated by the current flowing therethrough in the secondary circuit is kept sufficiently low that the secondary circuit remains completed at the contacts 15, 16 but should the flow of air be insufficient adequately to cool the rectifier the rise of temperature of the bi-metallic strip 14 will cause the latter to be deformed and separate the contacts 15, 16 so that the relay 2 is deenergized and the main circuit 1 interrupted. The bi-metallic strip 14 may if desired be heated by means of a heating resistance winding instead of by the current flowing therethrough. As soon as the bi-metallic strip cools sufficiently the contacts 15, 16 come together again so that this device is self re-setting.

Referring now to Figure 4 the thermostatic device comprises two wire helices 17, 18 which are placed under tension and soldered with a suitable metal or alloy at 19 so that when the flow of air is insufficient adequately to cool the rectifier the soldered joint 19 is fused and the ends of the helices 17, 18 separated so as to interrupt the secondary circuit containing the relay 2 (Figure 1) and thus interrupt the main circuit 1. In order to re-set the device for further operation the ends of the two helices have to be re-soldered in this case.

As shown in Figure 5 a length of suitable fuse wire 20 is used to connect the two terminals X, Y. The fuse wire is so selected that it interrupts the secondary circuit when the flow of air is insufficient adequately to cool the rectifier and has to be replaced in order to render the rectifier operative once more.

As regards the control of a rectifier installation by means of a centrifugal governor associated with a fan or by means of a vane or its equivalent subject to the flow of cooling fluid as hereinbefore referred to, the governor or vane may be arranged to open electric contacts 21, 22 in series with the relay 2 in the secondary circuit (Figure 6) when the speed of the fan or the flow of fluid in the cooling system as the case may be falls below a predetermined value sufficient adequately to cool the rectifier installation, a push-button contact 23 being provided, which when depressed is adapted to short circuit the contacts 21, 22 actuated by the governor or the vane so as to complete the secondary circuit through the energizing winding of the relay 2 in order to start the installation into operation. The push-button contact 23 must, as will be evident be held depressed so as to short circuit the contacts 21, 22 until the speed of the fan or the rate of flow of air is sufficient to close these contacts, whereupon the push-button contact may be released.

It will be evident that the invention is not limited to the particular construction and arrangement of the parts hereinbefore described which may be varied as desired to suit particular requirements without exceeding the scope of the invention.

Having now particularly described and ascertained the nature of my said invention and in what manner the same is to be performed, I declare that what I claim is:

1. In combination, in an electrical rectifier installation of the kind adapted to deal with relatively large currents and comprising a cooling fluid circulating system, a contact for controlling the operation of the rectifier, means for biasing said contact to its open position, means including a fusible connection for maintaining said contact closed against the force of said bias, and a heater for said fusible connection located so as to be influenced by said cooling fluid circulating system for causing said connection to fuse and to allow said contact to open whenever said cooling fluid circulating system becomes ineffective irrespective of the current then being delivered by said rectifier installation.

2. Apparatus for preventing the operating temperature of an electrical device from exceeding a predetermined value by means of a cooling fluid circulating system comprising, in combination, a contact for controlling the operation of said device, means for biasing said contact to a given control position, means including a fusible connection for maintaining said contact away from said given position against the force of said bias, and a heater for said fusible connection cooled by said fluid circulating system and effective to fuse said connection and cause operation of said contact upon a decrease in effectiveness of said fluid circulating system.

3. Apparatus for preventing the operating temperature of an electrical device from exceeding a predetermined value by means of a cooling fluid circulating system comprising, in combination, a contact for controlling the operation of said device, means for biasing said contact to a given control position, a connection which is mechanically rigid below a given operating temperature as determined by the safe operating temperature of said device but which loses its rigidity above said given operating temperature, means including said connection for maintaining said contact away from said given position against the force of said bias, and a heater for said connection cooled by said fluid circulating system and effective for causing said connection to lose its rigidity and thus to cause operation of said contact when the effectiveness of said fluid circulating system is decreased and the temperature of said device exceeds said safe operating value.

4. Apparatus for preventing the operating temperature of an electrical device from exceeding a predetermined value by means of a cooling fluid circulating system comprising, in combination, a circuit for controlling the operation of said device, a heater included in said circuit, a fusible connection associated with said circuit heated by said heater and cooled by said fluid circulating system, and biasing means for applying a force to said connection to cause the connection to open due to the flow of current in said circuit in the event of failure of said fluid circulating system.

5. Apparatus for preventing the operating temperature of an electrical device from exceeding a predetermined value by means of a cooling fluid circulating system comprising, in combination, a circuit for controlling the operation of said device, a heater included in said circuit, and a fusible connection associated with said circuit heated by said heater and cooled by said fluid circulating system, said connection acting to interrupt said circuit due to fusion by the heat accumulated at the connection from the flow of current in said circuit upon failure of said fluid circulating system.

6. Apparatus for preventing the operating temperature of an electrical device from exceeding a predetermined value comprising, in combination, a circuit for controlling the operation of said device, a normally closed fusible connection for controlling the effectiveness of said circuit which opens due to the heating effect of the current flowing in said circuit, and cooling fluid circulating means for cooling both said device and said connection, whereby normally said connection will remain closed and will maintain said circuit effective to enable said device to carry a load provided the cooling fluid circulating means remains effective but said connection will open and will thereby render said circuit ineffective irrespective of the load being carried by said device whenever said cooling fluid circulating means becomes ineffective.

7. Apparatus for preventing the operating temperature of an electrical device from exceeding a predetermined value comprising, in combination, a circuit for controlling the operation of said device, a fusible connection included in said circuit which opens due to the heat developed in said connection by the current flowing in said circuit, and cooling fluid circulating means for cooling both said device and said connection, whereby normally said connection will maintain said circuit closed to enable said device to carry a load provided the cooling fluid circulating means remains effective but will interrupt said circuit irrespective of the load being carried by said device whenever said cooling fluid circulating means becomes ineffective.

8. Apparatus for preventing the operating temperature of an electrical device from exceeding a predetermined value comprising, in combination, a circuit for controlling the operation of said device, a fusible connection included in said circuit, means for applying a separating force to said connection for causing said connection to open due to the heat developed in said connection by the current flowing in said circuit, and cooling fluid circulating means for cooling both said device and said connection, whereby normally said connection will maintain said circuit closed to enable said device to carry a load provided the cooling fluid circulating means remains effective but will interrupt said circuit irrespective of the load being carried by said device whenever said cooling fluid circulating means becomes ineffective.

SYDNEY ARTHUR STEVENS.